United States Patent [19]
Treadway et al.

[11] Patent Number: 5,768,499
[45] Date of Patent: Jun. 16, 1998

[54] METHOD AND APPARATUS FOR DYNAMICALLY DISPLAYING AND CAUSING THE EXECUTION OF SOFTWARE DIAGNOSTIC/TEST PROGRAMS FOR THE SILICON VALIDATION OF MICROPROCESSORS

[75] Inventors: James A. Treadway; Michael T. Wisor, both of Austin, Tex.

[73] Assignee: Advanced Micro Devices, Inc., Sunnyvale, Calif.

[21] Appl. No.: 627,878

[22] Filed: Apr. 3, 1996

[51] Int. Cl.⁶ .............................. G06F 11/00; G06F 11/22
[52] U.S. Cl. ..................... 395/183.22; 395/183.02
[58] Field of Search .................. 395/183.22, 183.01, 395/183.02

[56] References Cited

U.S. PATENT DOCUMENTS

| | | | |
|---|---|---|---|
| 5,367,667 | 11/1994 | Wahlquist et al. | 395/183.08 |
| 5,675,825 | 10/1997 | Dreyer et al. | 395/800 |

Primary Examiner—Robert W. Beausoliel, Jr.
Assistant Examiner—P. Vales
Attorney, Agent, or Firm—B. Noel Kivlin; Conley, Rose & Tayon

[57] ABSTRACT

The present invention permits a primary launch engine to display the names of, and information relating to, and cause the execution of diagnostic/test programs and/or batch-type routines for the silicon validation of microprocessors not only in existence at the time the primary launch engine is developed and compiled, but also, diagnostic/test programs and/or batch-type routines for the silicon validation of microprocessors that are developed and/or modified after the primary launch engine is developed and compiled without requiring modifications to, or the recompilation of, the primary launch engine. To do so, the present invention utilizes specialized data files consisting of one or more screen definition files and/or one or more script files wherein each screen definition file contains necessary menu structure and response information for each of the available diagnostic/test programs and wherein each of the script files contains sequencing and parameter information for each of the batch-type routines. These specialized data files are used by the primary launch engine to (i) display information pertaining to each of the available diagnostic/test programs and/or batch type routines and (ii) cause a general purpose computer to execute diagnostic/test programs and/or batch type routines selected by the user of the primary launch engine.

6 Claims, 3 Drawing Sheets

METHOD AND APPARATUS FOR DYNAMICALLY DISPLAYING AND CAUSING THE EXECUTION OF SOFTWARE DIAGNOSTIC/TEST PROGRAMS FOR THE SILICON VALIDATION OF MICROPROCESSORS

BACKGROUND OF THE INVENTION

1. Field of the Invention

This invention relates to the silicon validation of microprocessors, and more specifically, a method and apparatus for permitting a primary launch engine computer software program to dynamically display names and other relevant information for one or more separate diagnostic/test programs and/or one or more batch-type routines (each batch-type routine consisting of one or more of the separate diagnostic/test programs) for the silicon validation of microprocessors and for permitting the primary launch engine to cause the execution of one or more of the selected separate diagnostic/test programs and/or one or more of the batch-type routines for the silicon validation of microprocessors.

2. Description of the Relevant Art

A microprocessor may fail to function correctly due to, among other things, design errors, fabrication defects, and/or physical failures. A failure to properly implement a functional specification into the microprocessor represents a design error. While physical failures generally occur due to component wear-out and/or environmental factors, fabrication defects generally result from imperfect manufacturing processes.

After a particular model of microprocessor has successfully completed a design testing process, individual microprocessors of that particular model type generally undergo a silicon validation process (i.e., testing for fabrication defects or physical failures) in order to validate the correct operation of the individual microprocessor and/or a group of microprocessors for which the individual microprocessor is a representative sample.

Silicon validation generally includes selecting one or more diagnostic/test programs and/or batch-type routines (i.e., routines which cause the execution of one or more separate diagnostic/test programs, preferably in a sequential manner, for a specified number of iterations) for the microprocessor undergoing validation to perform, causing the microprocessor undergoing validation to perform the selected diagnostic/test programs and/or batch-type routines, recording the responses and results generated by the microprocessor undergoing validation, and comparing the recorded responses and results to expected responses and results. Any deviation of the recorded responses and results from the expected responses and results may represent a fabrication defect and/or physical failure of the microprocessor.

Generally, separate diagnostic/test programs are developed and used for the silicon validation process. Each separate diagnostic/test program and test is typically designed to validate one or more specific functional aspects of a microprocessor. Further, certain diagnostic/test programs are designed to be microprocessor specific (i.e., are intended for use in validating one or more functional aspects of a specific type of microprocessor). The design and development of these separate diagnostic/test programs and/or batch type routines is an ongoing, rather than static, process. That is, modifications and/or enhancements to current diagnostic/test programs (and/or batch-type routines), as well as the development of new diagnostic/test programs (and/or batch-type routines), continually occur. While performing the silicon validation process, an individual may, in addition to selecting a previously developed batch-type routine, designate and develop a new batch-type routine composed of group of diagnostic/test programs that differs from those currently available.

In order to facilitate the execution of one or more diagnostic/test programs and/or one or more batch-type routines, the current art generally employs two types of programs which typically consist of either: (1) a static launch engine which displays the names and other relevant information for the separate diagnostic/test programs, as well as the batch-type routines, that were available for use in the silicon validation process at the time the static launch engine was developed and compiled and which causes the execution of those separate diagnostic/test programs, as well as those batch-type routines, selected by the user for execution; or (2) a master validation program (consisting of (i) each of the separate diagnostic/test programs and/or those batch-type routines (all encoded within the master validation program as functions and/or routines) that were available at the time the master validation program was developed and compiled, and (ii) a static menu for informing a user of the available diagnostic/test programs and/or those batch-type routines for use in the silicon validation process) which displays information relating to available functions and/or routines (i.e., those diagnostic/test programs or tests and/or those batch-type routines encoded in the master validation program) and executes those functions and/or routines selected by the user for execution.

There are a number of problems and drawbacks associated with the current art. With respect to the first type of program generally employed by the current art (the static launch engine), any time a new diagnostic/test program and/or a batch-type routine is developed, the software code for the static launch engine must be revised and recompiled in order to incorporate the newly developed diagnostic/test programs or tests and/or batch-type routines into the menu display and control transfer portions of the static launch engine. Further, modifications and revisions to, as well as the recompilation of, the static launch engine may be required when a current diagnostic/test program and/or batch-type routine is modified or enhanced.

With respect to the second type of program generally employed by the current art (the master validation program), the software code for the master validation program must be revised and recompiled anytime (1) revisions and modifications and/or enhancements to the diagnostic/test programs and/or batch-type routines are made, and (2) new diagnostic/test programs and/or new batch-type routines are developed.

The above-noted required modifications and revisions to the current software programs employed by the current art (the static launch engine and the master validation program) provide for a very cumbersome and inefficient method to incorporate new or revised diagnostic/test programs, as well as new or revised batch-type routines. As previously noted, the design and development of these separate diagnostic/test programs and/or batch type routines is an ongoing process, and, therefore, modifications and revisions to the programs employed by the current art are often required. Moreover, each modification or revision to the static launch engine and/or the master validation program not only allows for the possibility of errors and bugs to be introduced into the static launch engine or the master validation program, respectively, but also, allows for the possibility of errors to be introduced into the diagnostic/test programs and batch-type routines. Finally, because modifications and revisions are continually required, more than one version of the static launch engine or master validation program may be available for use. Therefore, the possibility exists that a user would not be using the most recent version of the static launch engine or master validation program, and thereby, would not be conducting the silicon validation process with the most recent versions or types of diagnostic/test programs and/or batch-type routines available.

It would thus be advantageous to provide a method and apparatus for enabling a primary launch engine to not only display the names of, and information relating to, and cause the execution of those diagnostic/test programs and/or batch-type routines for the silicon validation of microprocessors in existence at the time the primary launch engine is developed and compiled, but also to dynamically display the names of, and information relating to, and cause the execution of diagnostic/test programs and/or batch-type routines for the silicon validation of microprocessors developed and/or modified after the primary launch engine is developed and compiled without requiring modifications to, or the recompilation of, the primary launch engine.

SUMMARY OF THE INVENTION

The problems outlined above are in large part solved by a method and apparatus for enabling a primary launch engine to display the names of, and information relating to, and cause the execution of diagnostic/test programs and/or batch-type routines for the silicon validation of microprocessors not only in existence at the time the primary launch engine is developed and compiled, but also, diagnostic/test programs and/or batch-type routines for the silicon validation of microprocessors that are developed and/or modified after the primary launch engine is developed and compiled without requiring modifications to, or the recompilation of, the primary launch engine.

In one embodiment, an apparatus for the silicon validation of microprocessors includes a general purpose computer, specialized data files, one or more diagnostic/test programs, and a primary launch engine. The general purpose computer includes the microprocessor undergoing silicon validation and storage media for storing the specialized data files, the diagnostic/test programs and/or batch-type routines, and the primary launch engine.

With respect to each of the separate diagnostic/test programs, certain of the specialized data files ("screen definition files") contain necessary menu structure and response information. Preferably, the screen definition files contain the following information for use by the launch engine: (i) the applicable menu level (e.g., main menu, first sub-level, second sub-level, etc.) that information relating to a diagnostic/test program will be displayed to the user, (ii) the text information that will be displayed to the user at the specified menu level, (iii) operating information (e.g., information indicating whether a function or procedure internal to the primary launch engine should be performed or whether one or more diagnostic/test programs external to the primary launch engine should be spawned (i.e., causing the general purpose computer to execute the selected diagnostic/test program(s))), (iv) one or more arguments for use by the internal functions or procedures or external diagnostic/test programs, and (v) help text that may be displayed to assist the user.

A preferred format for each screen definition file is:
BEGIN MENU
level, menu_item, response[,arguments]
help text
END MENU
where the above file-items are defined as follows:

| Name | Definition |
| --- | --- |
| level | level represents the level of the item on the menu hierarchy. Menu levels are preferably: 1 main menu, 2 first sub-level, 3 second sub-level, and so on. |
| menu_item | menu_item is the text as it will appear to the user. |
| Response | response_identifier response_name response_identifier is a lower case letter that identifies the type of response to be implemented by the primary launch engine. Response_name identifies the name of a function internal to the primary launch engine to be performed or the external diagnostic/test program(s) to be spawned. Response_identifiers are preferably: <br> i - execute Internal function <br> x - execute the eXecutable diagnostic/test program and test <br> Examples are: iscRunScriptFile, xFPU |
| arguments (optional) | arg_identifier arg1[,arg2, ... argn] The arg_identifier is a lower case 'a' followed by a list of arguments that will be used by the specified internal function or external diagnostic/test program. An example is: aCos, Sin, Tan, Cotan |
| help text | Text that will be displayed to the user preferably when the appropriate menu item is highlighted. |

With respect to each of the batch-type routines, certain of the specialized data files ("script files") preferably contain sequencing and parameter information such as the following relating to one or more of the available diagnostic/test programs: (i) information relating to where the results of the one or more specified diagnostic/test programs should be stored; (ii) operating information (e.g., information indicating which diagnostic/test programs external to the primary launch engine should be spawned), (iii) one or more arguments for use by the selected diagnostic/test programs, and (iv) the number of times the selected diagnostic/test programs are to be executed.

A preferred format for each script file is:
BEGIN TEST
[file_indent=file_name]
exec_ident exec_name
[arguments]
[count]
END TEST
where the above arguments are defined as follows:

| Name | Definition |
| --- | --- |
| file_indent = file_name (optional) | file_ident is preferably the text "logfile=", and file_name is the name of the file that is designated to store the results of the diagnostic/test program(s) and test(s). |
| exec_ident exec_name (optional) | exec_ident is a lower case letter that identifies the type of response to be implemented by the primary launch engine. Exec_name is the name(s) of the desired diagnostic/test programs that are to be spawned. |
| arguments (optional) | arg_identifier arg1[,arg2, ... argn] arg_identifier is a lower case 'a' followed by a list of arguments that will be utilized by the spawned diagnostic/test programs. |
| Count (optional) | count_ident count count_ident is a lower case 'c' and count is |

| Name | Definition |
|---|---|
| | the number of times the designated diagnostic/test programs are to run. |

A method of performing the silicon validation of a microprocessor includes first causing the general purpose computer to execute the primary launch engine. The primary launch engine then preferably determines the type of central processing unit undergoing the silicon validation process. After determining the type of central processing unit undergoing validation, the primary launch engine extracts information from the one or more screen definition files indicative of the separate diagnostic/test programs that are available for use in the silicon validation process.

The information contained in the one or more screen definition files also permits the primary launch engine to (i) determine if a particular diagnostic/test program is designed for the silicon validation of a type of microprocessor other than the one currently undergoing validation, (ii) inform the user of this fact, and (iii) preferably, require verification from the user before spawning such a diagnostic/test program. The primary launch engine then causes the general purpose computer to execute those diagnostic/test programs selected by the user.

An embodiment of the present invention also presents the user with a menu option which permits the user to determine, at the time this menu option is selected, which batch type routines are available for selection by the user. Upon selection of this menu option, the primary launch engine extracts and displays the relevant information from each of the one or more script files. The primary launch engine then causes the general purpose computer to execute those batch type routines selected by the user.

Employing specialized data files, a method and apparatus of the present invention is capable of enabling a primary launch engine to display the names of, and information relating to, and cause the execution of diagnostic/test programs and/or batch-type routines for the silicon validation of microprocessors not only in existence at the time the primary launch engine is developed and compiled, but also, diagnostic/test programs and/or batch-type routines for the silicon validation of microprocessors that are developed and/or modified after the primary launch engine is developed and compiled without requiring modifications to, or the recompilation of, the primary launch engine.

BRIEF DESCRIPTION OF THE DRAWINGS

Other objects and advantages of the invention will become apparent upon reading the following detailed description and upon reference to the accompanying drawings in which.

Figure 1:
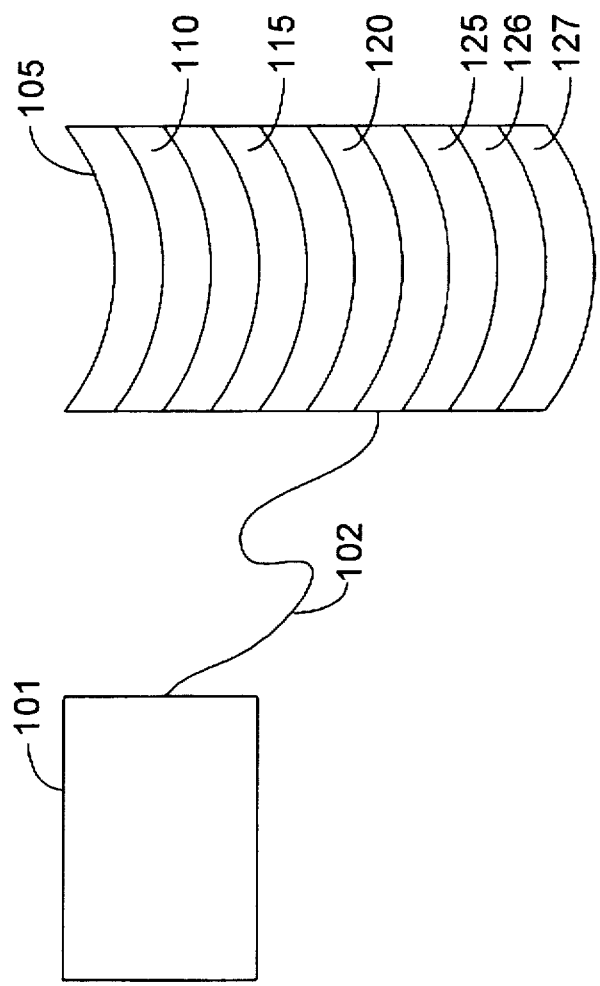
FIG. 1 is a representation of a computer system employing the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE INVENTION

FIG. 1 shows the general purpose computer 101 connected to storage media 105 by bus 102. Primary launch engine 110 resides on storage media 105 for execution by general purpose computer 101. Also residing on storage media 105, are screen definition file 115, script file 120, and diagnostic/test programs 125, 126, and 127. It should be noted that primary launch engine may utilize more than just one screen definition file 115 and/or script file 120 and that multiple screen definition files and/or script files may reside on storage media 105.

Preferably, the screen definition files 115 contain the following information for use by primary launch engine 110: (i) the applicable menu level (e.g., main menu, first sub-level, second sub-level, etc.) that information relating to a diagnostic/test program will be displayed to the user, (ii) the text information that will be displayed to the user at the specified menu level, (iii) operating information (e.g., information indicating whether a function or procedure internal to the primary launch engine should be performed or whether one or more diagnostic/test programs external to the primary launch engine should be spawned (i.e., causing the general purpose computer to execute the selected diagnostic/test program(s))), (iv) one or more arguments for use by the internal functions or procedures or external diagnostic/test programs, and (v) help text that may be displayed to assist the user. While it is preferable to have one screen definition file that contains the applicable information for each of the diagnostic/test programs 125, 126, and 127, multiple screen definition files corresponding to one or more of the diagnostic/test programs may be utilized as well.

A preferred format for each screen definition file is:

BEGIN MENU level, menu_item, response[,arguments]

help text

END MENU where the above file-items are defined as follows:

| Name | Definition |
|---|---|
| level | level represents the level of the item on the menu hierarchy. Menu levels are preferably: 1 main menu, 2 first sub-level, 3 second sub-level, and so on. |
| menu_item | menu_item is the text as it will appear to the user. |
| Response | response_identifier response_name response_identifier is a lower case letter that identifies the type of response to be implemented by the primary launch engine. Response_name identifies the name of a function internal to the primary launch engine to be performed or the external diagnostic/test program(s) to be spawned. Response_identifiers are preferably:<br>i - execute Internal function<br>x - execute the eXecutable diagnostic/test program and test<br>Examples are: iscRunScriptFile, xFPU |
| arguments (optional) | arg_identifier arg1[,arg2, . . . argn]<br>The arg_identifier is a lower case 'a' followed by a list of arguments that will be used by the specified internal function or external diagnostic/test program. An example is:<br>aCos, Sin, Tan, Cotan |
| help text | Text that will be displayed to the user preferably when the appropriate menu item is highlighted. |

The following is an example of a screen definition file for multiple diagnostic/test programs:

```
BEGIN MENU
1File
Open, Close, Save and Delete files
2Run Script file,iscRunScriptFile
Run a script file
2Run Remote Script,icoRemoteOPMenu
Run remote system
2Logfile,iutEnterLogFile
Enter a log filename
2Edit/Create Script file,iedScriptEntryEdit
Edit/Create a script file
1Options
Cache, Cpu override
2Cache
Cache on the barrel head
2Cpu override
Cpu override overthere
2Other
Other help text
3IO texts,xIODIAG,aTest1,Test2
io test help text
3Floppy tests
floppy test text
END MENU
```

It should be noted that while the above is an example of a screen definition file that contains menu structure and response information for more than one diagnostic/test program, separate screen definition files for one or more diagnostic/test programs may also be employed.

Script file 120 preferably contains sequencing and parameter information such as the following relating to one or more of available diagnostic/test programs 125, 126, and 127: (i) information relating to where the results of the one or more specified diagnostic/test programs should be stored; (ii) operating information (e.g., information indicating which diagnostic/test programs external to the primary launch engine should be spawned), (iii) one or more arguments for use by the selected diagnostic/test programs, and (iv) the number of times the selected diagnostic/test programs are to be executed.

A preferred format for each script file is:

```
BEGIN TEST
[file_indent=file_name]
exec_ident exec_name
[arguments]
[count]
END TEST
``` where the above arguments are defined as follows:

| Name | Definition |
| --- | --- |
| file_indent = file_name (optional) | file_ident is preferably the text "logfile=", and file_name is the name of the file that is designated to store the results of the diagnostic/test program(s) and test(s). |
| exec_ident exec_name (optional) | exec_ident is a lower case letter that identifies the type of response to be implemented by the primary launch engine. Exec_name is the name(s) of the desired diagnostic/test programs that are to be spawned. |
| Arguments (optional) | arg_identifier arg1[,arg2, . . . argn] arg_identifier is a lower case 'a' followed by a list of arguments that will be utilized by the spawned diagnostic/test programs. |

-continued

| Name | Definition |
| --- | --- |
| Count (optional) | count_ident count count_ident is a lower case 'c' and count is the number of times the designated diagnostic/test programs are to run. |

The following are examples of three script files:

```
BEGIN TEST
logfile=FPUTST01
xFPU
afcos,fsin,fmul
c3
END TEST

BEGIN TEST
xIOTEST
c100
END TEST

BEGIN TEST
logfile=FLOPPY.TST
xFLOP
c6
END TEST
```

The process utilized by primary launch engine 110 for extracting information from screen definition file 115 employs a linked list data structure, preferably a binary tree, to generate a multi-level data structure for storing the information extracted from the one or more screen definition files. Preferably the information for each diagnostic/test program extracted from the one or more screen definition files is stored within the data structure so that all information associated with a specific menu level (i.e., hierarchy) resides at the same level of the data structure (e.g., all information specific to menu level 1 (the main menu) would reside at the highest level within the structure, all information specific to menu level 2 (the first sub-level) would reside at the second highest level within the structure, and so on). Storage of the extracted information in this manner permits the primary launch engine to display the menu of available diagnostic/ test programs, as well as other pertinent information (including help text as well as accessing or creating one or more script files) for use in the silicon validation process, by allowing the user to "walk" (i.e., traverse) the multi-level data structure as it desires.

The information contained in the one or more screen definition files also permits the primary launch engine to (i) determine if a particular diagnostic/test program is designed for the silicon validation of a type of microprocessor other than the one currently undergoing validation, (ii) inform the user of this fact (preferably by way of shading or marking the information relating to the particular diagnostic/test program or test), and (iii) preferably, require verification from the user before spawning such a diagnostic/test program. The primary launch engine then causes the general purpose computer to execute those diagnostic/test programs selected by the user.

An embodiment of the present invention also presents the user with a menu option which permits the user to determine, at the time this menu option is selected, which batch type routines are available for selection by the user. Upon selection of this menu option, the primary launch engine extracts and displays the relevant information from each of the one or more script files. The primary launch engine then causes the general purpose computer to execute those batch type routines selected by the user. One embodiment of the present invention also permits the user to create new script files either by transferring directly to the operating system to create the new script file or by providing the user with a text editor, internal to the primary launch engine, for creating the new script file.

As noted above, because the primary launch engine extracts and displays the relevant information from the one or more available script files for each batch type routine each time the corresponding menu item is selected, the user can determine which batch type routines are available at the very time the corresponding menu item is selected. Consequently, if the menu option was selected after the creation of the new script file, information pertaining to the newly created batch type routine in the applicable script file would be displayed to the user and the new routine would be available to be selected for execution.

Figure 2A:
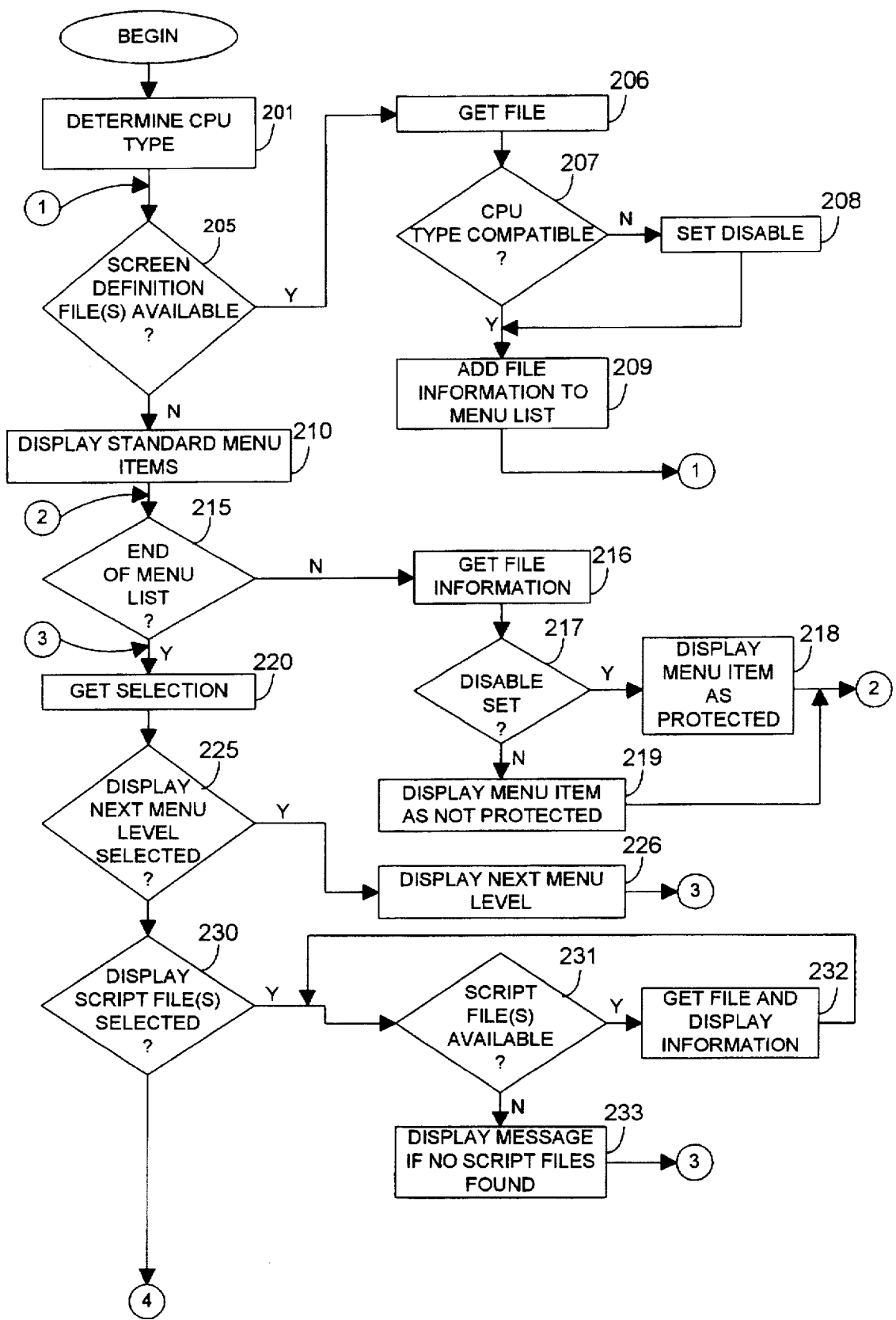
FIG. 2 is a flow chart depicting a process for the operation of the primary launch engine.
Figure 2B:
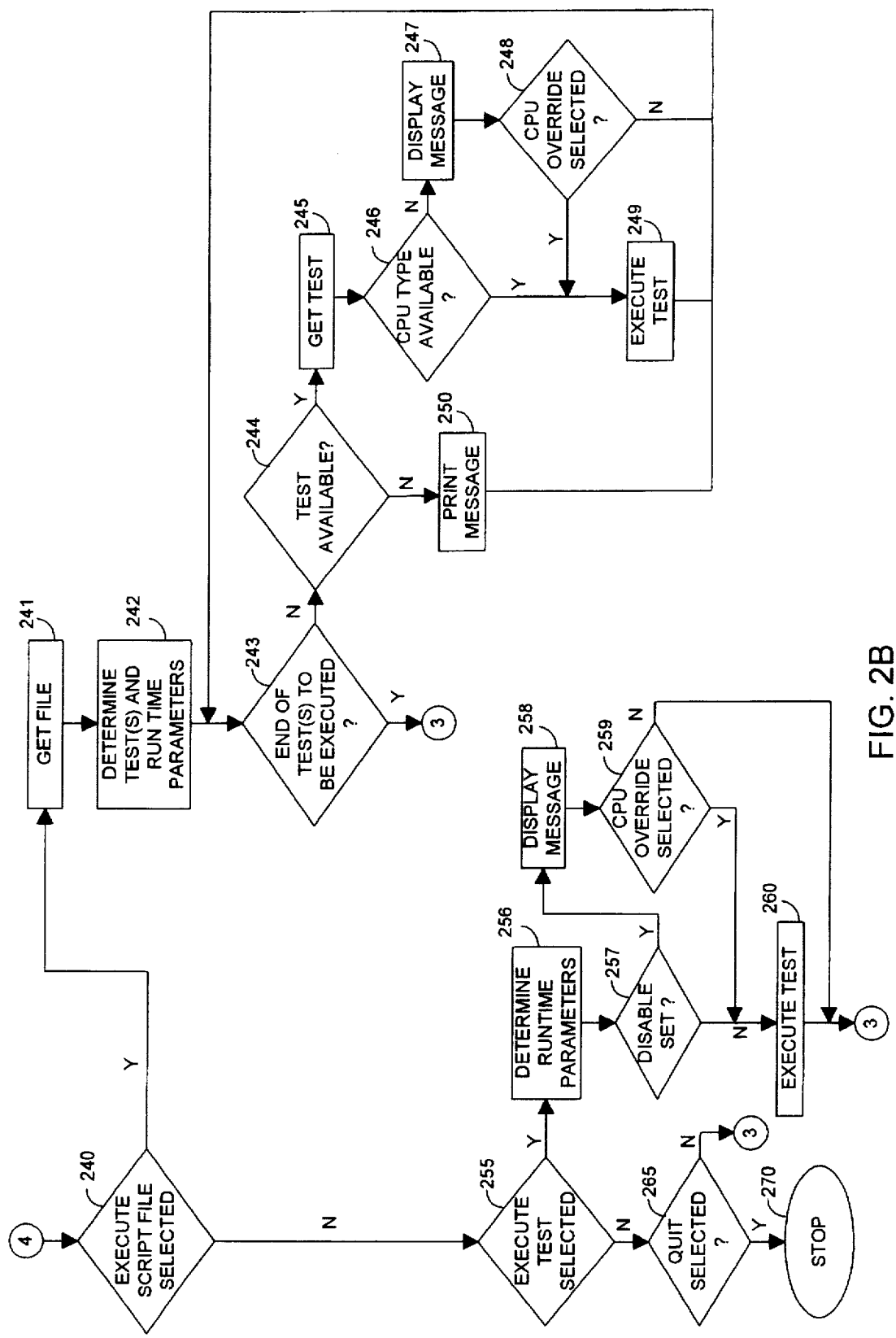

FIG. 2 illustrates a method for permitting the primary launch engine to dynamically display the names and other relevant information of one or more separate diagnostic/test programs and/or display the names and other relevant information of one or more batch-type routines for the silicon validation of microprocessors.

Step 201 involves determining the type of central processing unit for the microprocessor undergoing silicon validation. Steps 205-209 relate to screen definition files that define the menu structure for the separate diagnostic/test programs. Specifically, the existence of one or more of these files is determined during step 205. If one or more of the screen definition files are available, then the first of the available files is retrieved during step 206. The type of central processing unit for which the test was designed is determined and if the determined type of microprocessor is not compatible with the type of the microprocessor undergoing silicon validation in step 207, a disable flag with respect to the specific diagnostic/test is set in step 208. If the type of central processing unit is compatible (as determined in step 207), then step 208 is ignored. Information relating to the diagnostic/test program is added to the menu list during step 209 and the next screen definition file is retrieved in step 206. Once all of the screen definition files have been retrieved by steps 205 and 206, then standard menu information is displayed to the user in step 210. Steps 215-219 consist of displaying specific information relating to the diagnostic/test programs that are available for use in the silicon validation process.

While not at the end of the menu list as determined by step 215, information is retrieved in step 216 and a determination is made as to whether the disable flag is set in step 217. If the disable flag has been set, then the menu information is displayed as protected in step 218. If the disable flag has not been set, then the information is displayed as not protected in step 219. Once the menu has been displayed to the user, step 220 consists of accepting the user's input. Generally the user has six possible selections: displaying additional information in step 225; displaying specialized script files in step 230; executing script files in step 240; executing specific diagnostic/test programs in step 255; or terminating the primary launch engine in step 265.

If the user desires to display additional information by selecting step 225, the desired information is displayed in step 226 and a return to accepting the user's selection in step 220 is made. If the user desires to display available script files by selecting step 230, a determination is made as to whether script files are available in step 231. If script files are available, information relating to each script file is retrieved and displayed in step 232. If, however, script files are not available as determined in step 231, a message is displayed to the user that no script files were found in step 233.

Assuming that script files have been found and the information displayed to the user, the user may select the execution of a particular script file in step 240. If the execution of the script file is selected, the file is retrieved in step 241 and read to determine what diagnostic/test programs are to be executed and the relevant run time parameters for their execution in step 242. Determination is then made as to whether each of the desired diagnostic/test programs are available for execution in step 243. If the diagnostic/test program is available as determined in step 244, the program is retrieved during step 245 and a determination is made as to whether the type of central processing unit for which the program was designed is compatible with the type of central processing unit of the microprocessor undergoing silicon validation in step 246. If the type of central processing unit is compatible, the test is executed during step 249. If the type of central processing unit is not compatible, a message is displayed to the user by step 247 and an override option is presented to the user to nevertheless execute the program in step 248. If the user selects the override option, the primary launch engine causes the general purpose computer to execute the program in step 249. If the user decides not to select the override option, control is passed back to determining whether all diagnostic/test programs within the script file have been executed.

The user may select the execution of a specific diagnostic/test program in step 255. If so, the relevant run time parameters for the test are first determined during step 256 and then a determination is made as to whether the disable flag for the particular program has been set in step 257. If the disable flag has been set, then a message is displayed to the user in step 258 and an override option is presented to the user as to whether to continue with the program in step 259. If the override option is selected, the program is executed in step 260 and control is returned to determining the user's next selection by step 220. If the override option is not selected, control is returned to determining the user's next selection. If the user selects the quit option in step 265, the dynamic launch engine is terminated during step 270.

What is claimed is:

1. A method for controlling the operation of a general purpose computer to display information indicative of a plurality of separately executable diagnostic/test programs for validating the operation of a central processing unit and to cause the execution of at least one of said plurality of separately executable diagnostic/test programs, wherein said general purpose computer includes storage media and wherein said storage media includes said plurality of separately executable diagnostic/test programs, a primary launch engine, and at least one definition file, comprising:

executing said primary launch engine;

said primary launch engine extracting information from said at least one definition file indicative of said plurality of separately executable diagnostic/test programs and data necessary to execute said plurality of separately executable diagnostic/test programs;

said primary launch engine displaying information to said user indicative of said plurality of separately executable diagnostic/test programs, wherein said displaying information includes indicating to said user which of said plurality of separately executable diagnostic/test programs are compatible with said central processing unit;

said primary launch engine accepting an input from said user indicative of which of said plurality of separately executable diagnostic/test programs said user has selected for execution; and said primary launch engine instructing said general purpose computer to execute at least one of said plurality of separately executable diagnostic/test programs in response to said input.

2. The method as recited in claim 1 further comprising said primary launch engine determining a type of central processing unit utilized by said general purpose computer.

3. The method as recited in claim 2 wherein the step of said primary launch engine extracting information from said at least one definition file includes:

said primary launch engine retrieving said at least one definition file;

said primary launch engine extracting a plurality of menu records from said at least one definition file, wherein each of said plurality of menu records includes information indicative of one of said plurality of separately executable diagnostic/test programs, data necessary to display and execute said one of said plurality of separately executable diagnostic/test programs, and a type of central processing unit for which said one of said plurality of diagnostic/test programs is designed to test;

said primary launch engine comparing the type of central processing unit associated with each of said menu records with said type of central processing unit utilized by said general purpose computer;

said primary launch engine adding said plurality of menu records to a dynamic menu-list, wherein each menu record in said dynamic menu-list includes a disable flag;

said primary launch engine setting said disable flag for a menu record when said comparing detects that said type of central processing unit associated with said menu record is not compatible with said type of central processing unit utilized by said general purpose computer.

4. The method as recited in claim 3 wherein the step of said primary launch engine displaying information to said user includes:

said primary launch engine retrieving a menu record from said dynamic menu-list;

said primary launch engine displaying a portion of said menu record from said dynamic menu-list, wherein said portion indicates that said one of said plurality of separately executable diagnostic/test programs associated with said menu record may be selected by said user for execution, wherein said displaying a portion of said menu record includes displaying an incompatibility indication if said display flag associated with said menu record is set, wherein said incompatibility indication informs said user that said one of said plurality of separately executable diagnostic/test programs corresponding to said menu record is not compatible with said central processing unit utilized by said general purpose computer.

5. The method as recited in claim 4 wherein the step of said primary launch engine accepting an input from said user includes:

said primary launch engine analyzing said input to determine which menu records said user has selected for execution; and said primary launch engine examining said disable flags associated with said user selected menu record;

said primary launch engine requiring said user to select an override function for a user selected menu record if said disable flag associated with said user selected menu record is set, wherein said selection of said override function invokes execution of said one of said plurality of separately executable diagnostic/test programs corresponding to said user selected menu record whose disable flag is set.

6. The method as recited in claim 3, wherein each of said plurality of menu records also includes a domain indicator, wherein said domain indicator associated with a menu record determines whether said one of said plurality of separately executable diagnostic/test programs associated with said menu record resides internal to said primary launch engine or external to said primary launch engine;

said primary launch engine examining said domain indicator for a menu record which said user has selected;

said primary launch engine executing said one of said plurality of separately executable diagnostic/test programs associated with said menu record if said domain indicator indicates that said one of said plurality of separately executable diagnostic/test programs associated with said menu record resides internal to said primary launch engine;

said primary launch engine spawning said one of said plurality of separately executable diagnostic/test programs associated with said menu record if said domain indicator indicates that said one of said plurality of separately executable diagnostic/test programs associated with said menu record resides external to said primary launch engine.

* * * * *